(12) United States Patent
Kanehisa et al.

(10) Patent No.: US 8,651,583 B2
(45) Date of Patent: Feb. 18, 2014

(54) BICYCLE WHEEL SPOKE ASSEMBLY

(75) Inventors: Takanori Kanehisa, Sakai (JP); Masashi Goto, Sakai (JP); Seiji Mouri, Sakai (JP)

(73) Assignee: Shimano Inc., Osaka (JP)

( * ) Notice: Subject to any disclaimer, the term of this patent is extended or adjusted under 35 U.S.C. 154(b) by 280 days.

(21) Appl. No.: 12/788,034

(22) Filed: May 26, 2010

(65) Prior Publication Data
US 2011/0291466 A1 Dec. 1, 2011

(51) Int. Cl.
*B60B 1/04* (2006.01)

(52) U.S. Cl.
USPC ................................ 301/59; 301/61; 301/104

(58) Field of Classification Search
USPC ............ 301/55, 56, 58, 59, 61, 104; 411/176, 411/177, 180
See application file for complete search history.

(56) References Cited

U.S. PATENT DOCUMENTS

| | | | | |
|---|---|---|---|---|
| 286,476 | A | * | 10/1883 | Notley ............................ 301/59 |
| 298,632 | A | * | 5/1884 | Smith ............................... 152/5 |
| 1,856,752 | A | * | 5/1932 | Ellinger ......................... 248/261 |
| 3,651,563 | A | * | 3/1972 | Volkmann ....................... 29/523 |
| 4,732,518 | A | * | 3/1988 | Toosky ......................... 411/181 |
| 5,445,483 | A | * | 8/1995 | Fultz ............................. 411/181 |
| 6,068,348 | A | | 5/2000 | Okajima et al. |
| 6,415,563 | B2 | * | 7/2002 | Rillie et al. ..................... 52/200 |
| 7,070,245 | B2 | * | 7/2006 | Tanaka ............................. 301/59 |
| 7,306,292 | B2 | * | 12/2007 | Muraoka et al. ................. 301/61 |
| 7,357,459 | B2 | * | 4/2008 | Schlanger ........................ 301/59 |
| 7,360,847 | B2 | * | 4/2008 | Okajima et al. ................. 301/61 |
| 7,374,251 | B2 | * | 5/2008 | Okajima et al. ................. 301/58 |
| 2004/0149076 | A1 | | 8/2004 | Yamanaka |
| 2006/0261666 | A1 | | 11/2006 | Passarotto |
| 2008/0054709 | A1 | * | 3/2008 | Spahr et al. ..................... 301/9.1 |
| 2008/0315674 | A1 | * | 12/2008 | Passarotto et al. .............. 301/55 |

FOREIGN PATENT DOCUMENTS

| | | |
|---|---|---|
| DE | 44 15 505 A1 | 11/1995 |
| EP | 1 101 631 A1 | 5/2001 |
| EP | 1 724 122 A1 | 11/2006 |
| EP | 1 892 120 A1 | 2/2008 |
| EP | 1 894 743 A2 | 3/2008 |
| JP | 2006-321480 A | 11/2006 |

OTHER PUBLICATIONS

European Search Report of corresponding EP Application No. 11 16 5035.4 dated Sep. 8, 2011.
Photograph of a set of Automotive Lugnuts, (Apr. 13, 2010).
Photograph of a set of Locking Automotive Lugnuts, (Apr. 13, 2010).

* cited by examiner

*Primary Examiner* — Kip T Kotter
(74) *Attorney, Agent, or Firm* — Global IP Counselors

(57) ABSTRACT

A bicycle wheel spoke assembly includes a spoke and a spoke nut. The spoke has a rim attachment end and a hub attachment end. The spoke nut has a main body with a cylindrical shaped outer surface and a bore extending at least partially through the main body. The outer surface has at least one axially extending rib configured for engagement with a spoke aperture of a bicycle wheel hub. The bore of the main body of the spoke nut includes threads with the hub attachment end of the spoke being threadedly secured within the bore.

20 Claims, 14 Drawing Sheets

BICYCLE WHEEL SPOKE ASSEMBLY

BACKGROUND

1. Field of the Invention

This invention generally relates to a bicycle wheel spoke assembly. More specifically, the present invention relates to bicycle wheel spoke assembly with a spoke nut configured to non-rotatably engage a wheel hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a spoke assembly having a spoke that includes a flattened profile with a hub attachment configuration that prevents rotation of the spoke relative to the hub.

In view of the state of the known technology, a bicycle wheel spoke assembly includes a spoke and a spoke nut. The spoke has a rim attachment end and a hub attachment end. The spoke nut has a main body with a cylindrical shaped outer surface and a bore extending at least partially through die main body. The outer surface has at least one axially extending rib configured for engagement with a spoke aperture of a bicycle wheel hub. The bore of the main body of the spoke nut includes threads with the hub attachment end of the spoke being threadedly secured within the bore.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
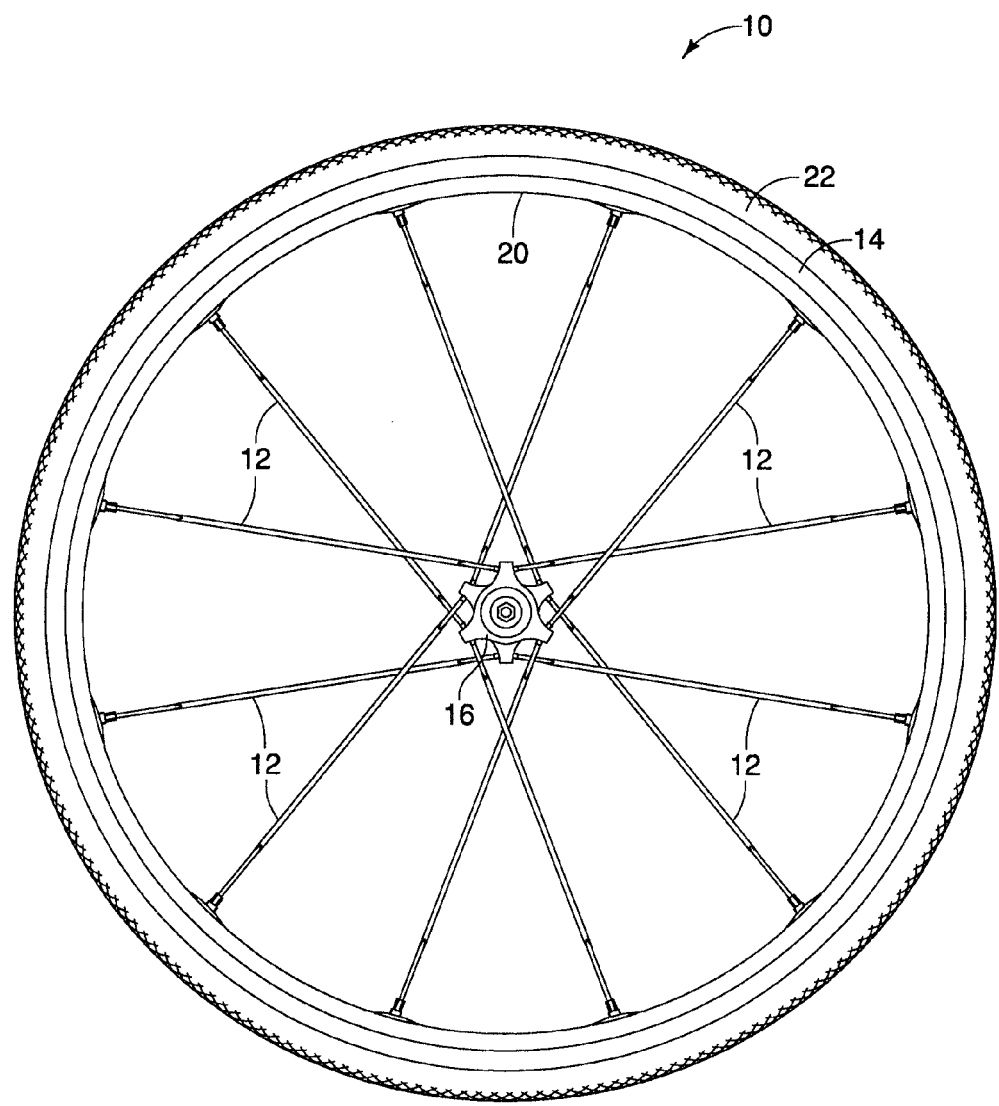
FIG. 1 is a side elevational view of a bicycle wheel that includes a plurality of spoke assemblies that extend between a hub and a rim of the bicycle wheel in accordance with a first embodiment.

Referring initially to FIG. 1, a bicycle wheel 10 is illustrated with plurality of spoke assemblies 12 in accordance with a first embodiment.

Figure 13:
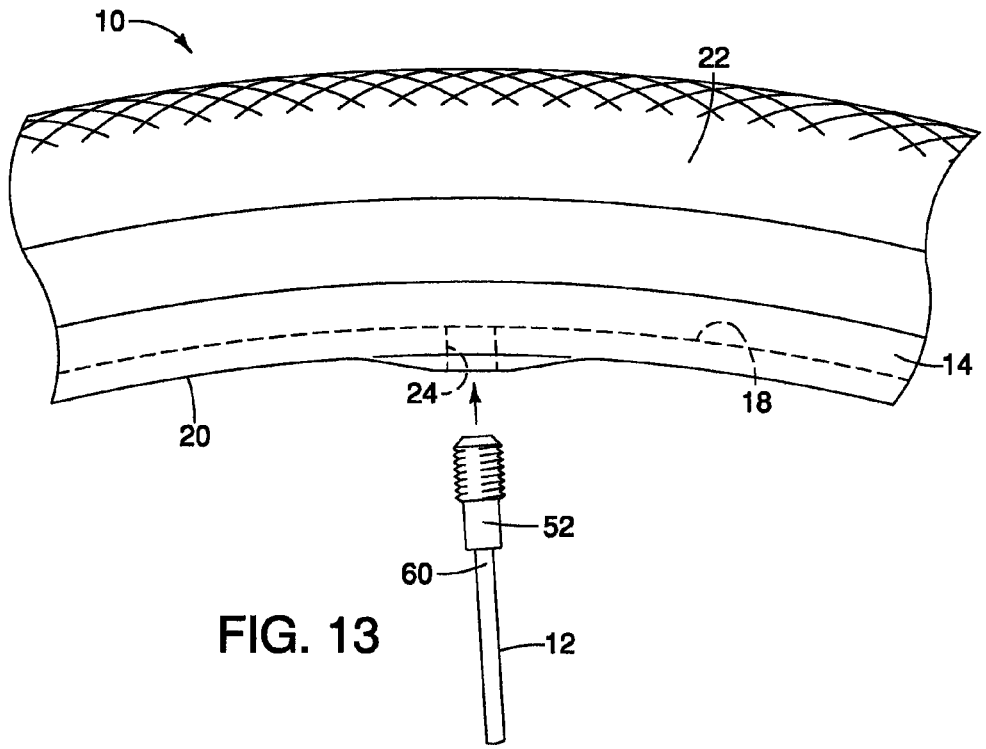
FIG. 13 is a side elevational view of the bicycle wheel showing the spoke and the spoke nipple just prior to installation of the spoke nipple the rim in accordance with the first embodiment.
Figure 14:
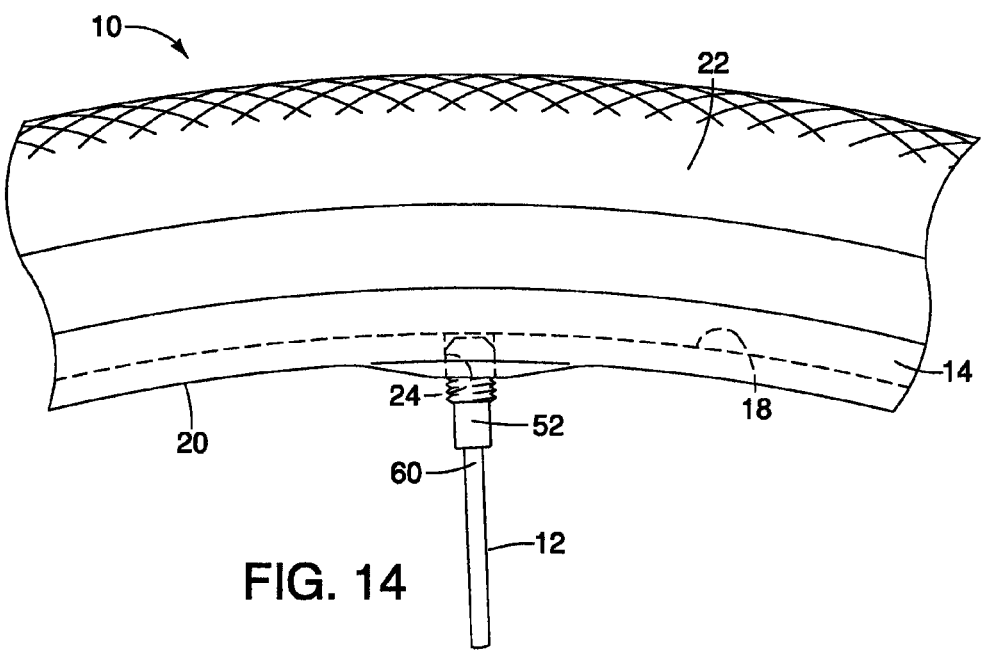
FIG. 14 is another side elevational view of the bicycle wheel similar to FIG. 13 showing the spoke and the spoke nipple being installed to the rim in accordance with the first embodiment.

The bicycle wheel 10 includes a rim 14, a hub 16 and the plurality of spoke assemblies 12. The rim 14 is an annular member that includes a conventional tire receiving recess 18 (see FIGS. 13 and 14) and a radially extending inner surface 20. A tire 22 is mounted to the rim 14 in a conventional manner. As shown in FIGS. 13 and 14, the inner surface 20 includes a plurality of threaded apertures 24 whose purpose is described in greater detail below along with a description of the plurality of spoke assemblies 12.

Figure 2:
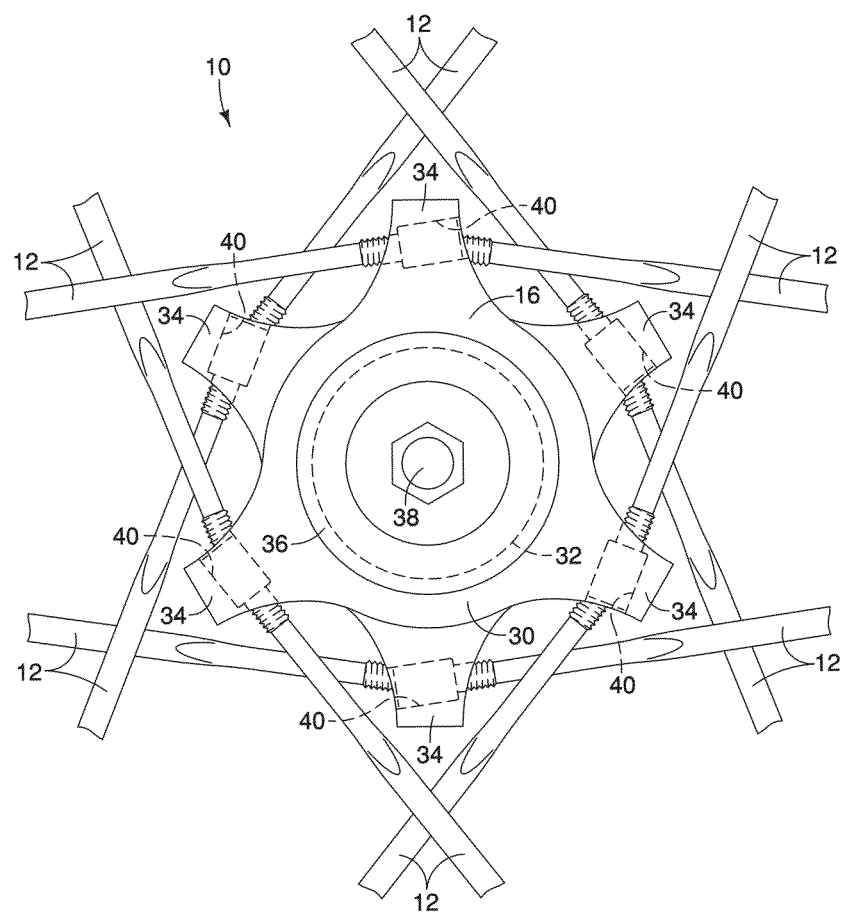
FIG. 2 is a side elevational view of the hub showing a portion of each of the plurality of spoke assemblies in accordance with the first embodiment.

As best shown in FIG. 2, the hub 16 includes a main body 30, a central opening 32, and a plurality of projections 34. The main body 30 can be made of any of a variety of materials, such as steel, aluminum, or other light weight metals or metal alloys. The central opening 32 is dimensioned to receive an axle assembly 36 that includes a conventional axle 38 and bearings (not shown) that allow the bicycle wheel 10 to freely rotate about the axle 38 in a conventional manner.

Each of the projections 34 of the hub 16 includes a pair of spoke receiving apertures 40. The spoke receiving apertures 40 in each projection are the same, but extend in opposing directions. Since they are the same, a description of only one of the spoke receiving apertures 40 is provided for the sake of brevity, but applies to both spoke receiving apertures 40.

Figure 15:
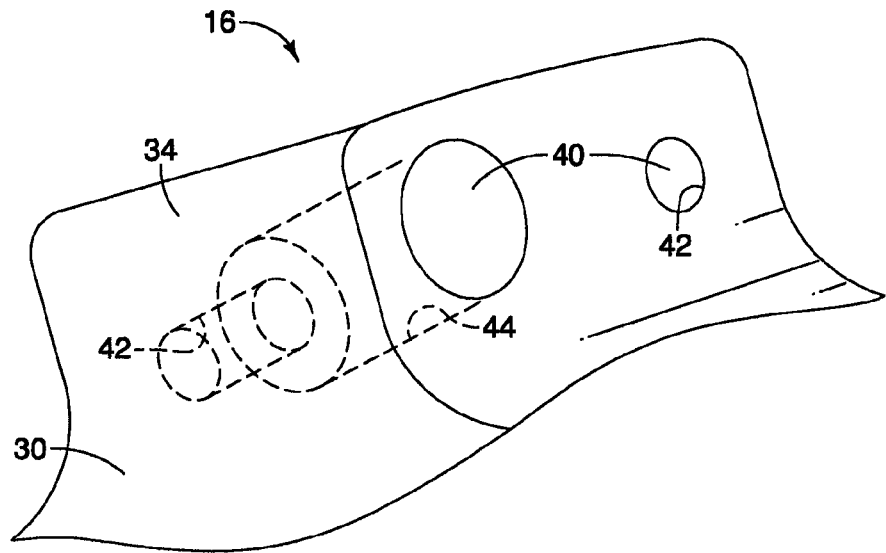
FIG. 15 is a perspective view of a portion of the hub showing a projection with a spoke receiving opening in accordance with the first embodiment.
Figure 16:
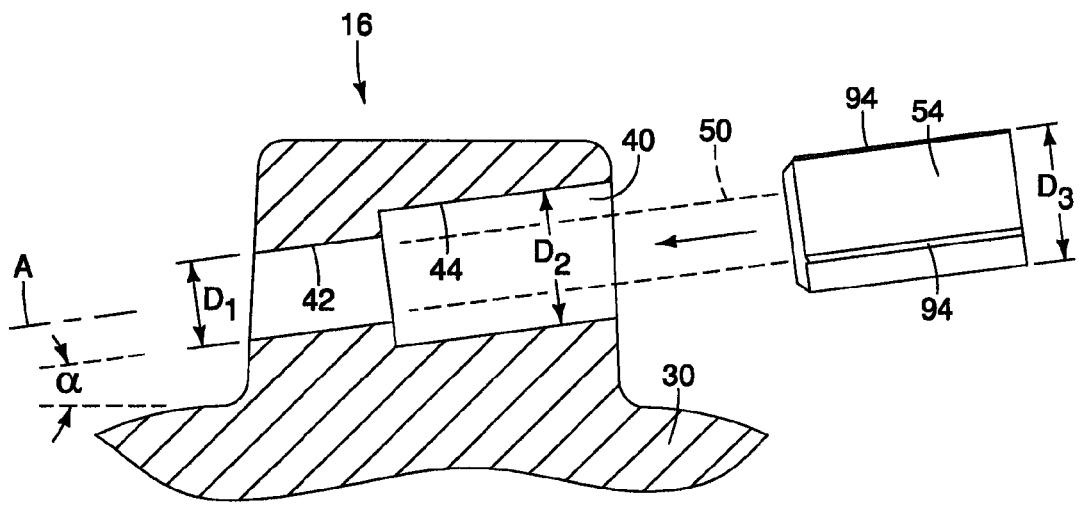
FIG. 16 is an exploded cross-sectional view of the portion of the hub showing the spoke receiving opening of the projection and the spoke nut, with the spoke nut ready for installation into the spoke receiving opening in accordance with the first embodiment.
Figure 17:
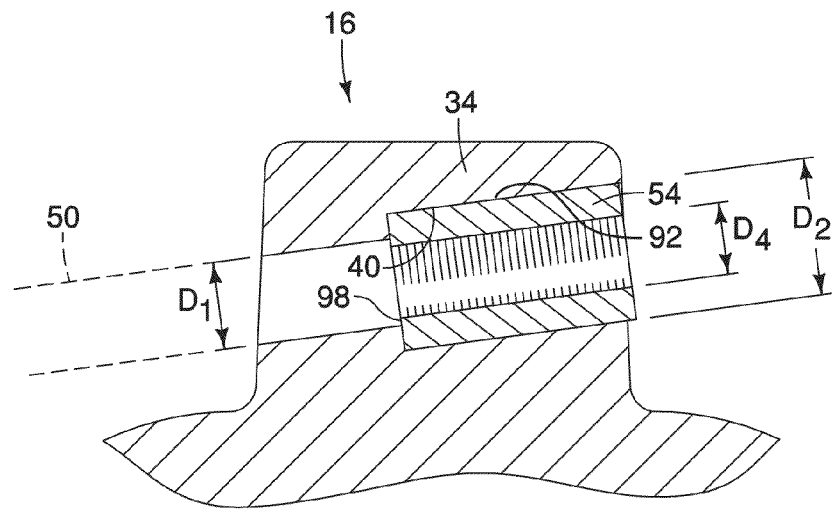
FIG. 17 is another cross-sectional view of the portion of the hub showing the spoke nut installed within the spoke receiving opening of the projection in accordance with the first embodiment.
Figure 18:
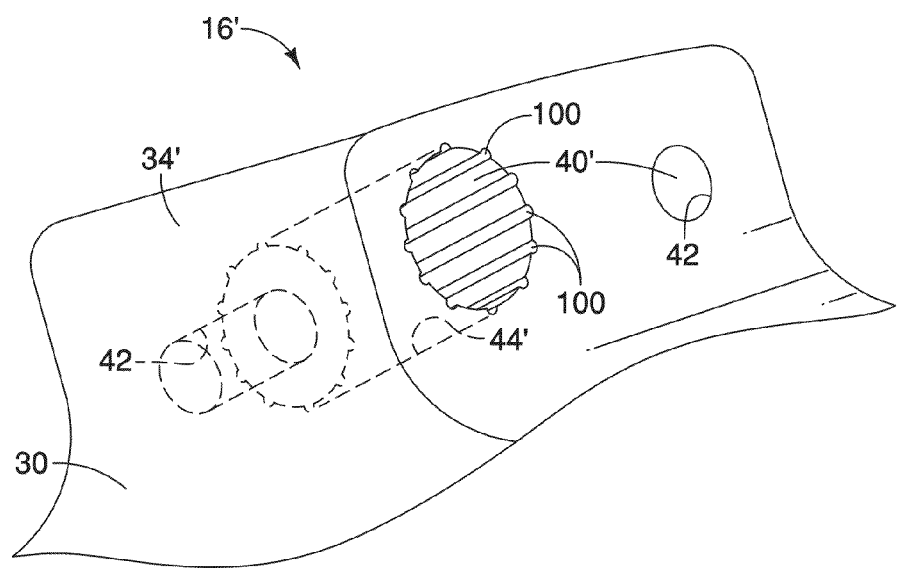
FIG. 18 is a perspective view of a portion of a hub showing a projection with a spoke receiving opening that includes a plurality of recesses in accordance with a second embodiment.
Figure 19:
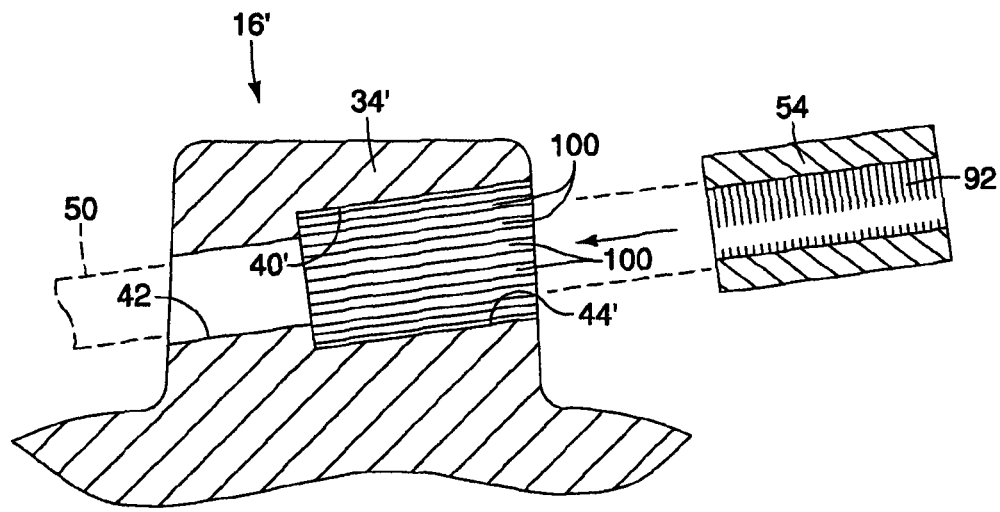
FIG. 19 is an exploded cross-sectional view of the portion of the hub showing the spoke receiving opening of the projection with the spoke nut ready for installation into the spoke receiving opening in accordance with the second embodiment.
Figure 20:
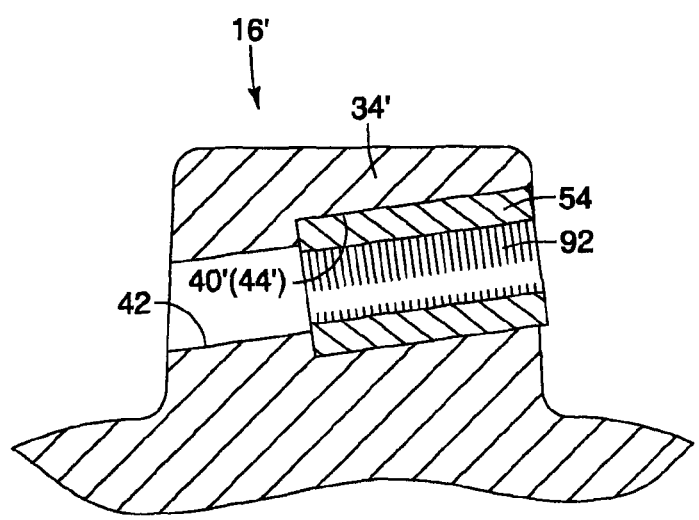
FIG. 20 is another cross-sectional view of the portion of the hub similar to FIG. 19 showing the spoke nut installed in the spoke receiving opening in accordance with the second embodiment.
Figure 21:
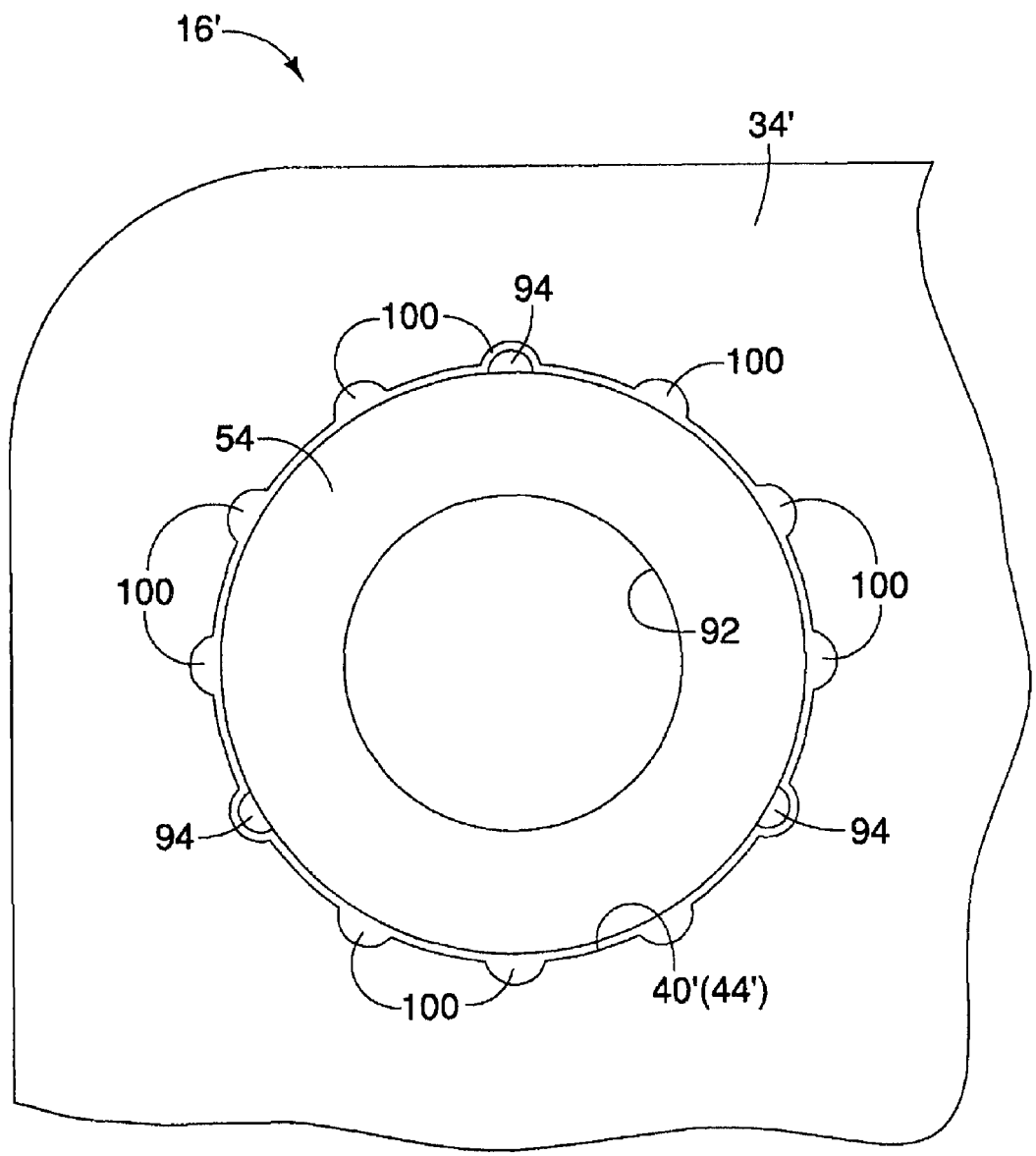
FIG. 21 is an end view of the portion of the hub showing ribs of the spoke nut installed in several of the recesses of the spoke receiving opening in accordance with the second embodiment.

As best shown in FIGS. 15, 16 and 17, each of the spoke receiving apertures 40 includes a first section 42 and a second section 44. As best shown in FIGS. 16 and 17, the first section 42 has first diameter $D_1$ and the second section 44 has a second diameter $D_2$ that is larger than the first diameter $D_1$. Consequently, the second section 44 is wider than the first section 42. As is explained in greater detail below, the first section 42 of the spoke receiving aperture is a spoke receiving section such that a portion of the spoke assembly 12 extends therethrough. As is also explained in greater detail below, the second section 44 of the spoke receiving aperture is a spoke nut receiving section such that a spoke nut 54 (described below) of the spoke assembly 12 is installable therein.

The second section 44 (and optionally the first section 42) of the spoke receiving apertures 40 has a smooth cylindrically shaped surface.

Figures 3, 4:
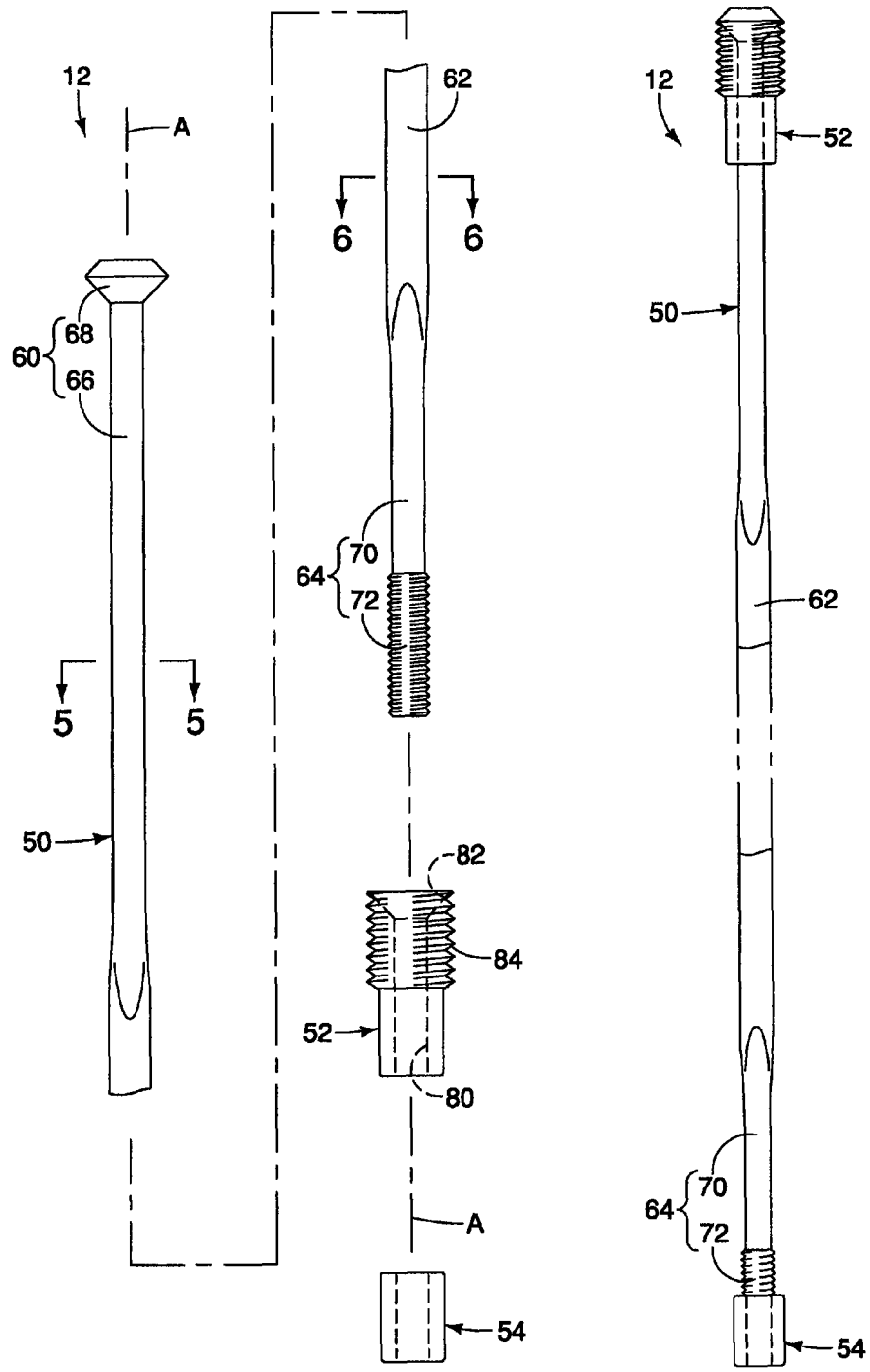
FIG. 3 is an exploded view of one of the spoke assemblies of the plurality of spoke assemblies shown removed from the bicycle wheel, showing spoke, a spoke nipple and a spoke nut in accordance with the first embodiment.
FIG. 4 is a side elevational view of the spoke assembly depicted in FIG. 3, shown with the spoke nipple and the spoke nut installed on the spoke in accordance with the first embodiment.

A description is now provided of the plurality of spoke assemblies 12 with specific reference to FIGS. 3 and 4. Each of the plurality of spoke assemblies 12 is identical. Therefore, description of only one of the spoke assemblies 12 is provide for the sake of brevity, and applies equally to each one of the plurality of spoke assemblies 12.

As shown in FIGS. 3 and 4, the spoke assembly 12 includes a spoke 50, a spoke nipple 52 and the spoke nut 54. The spoke 50 is an elongated metallic member that includes a rim attachment end 60, a central section 62 and a hub attachment end 64.

Figure 5:
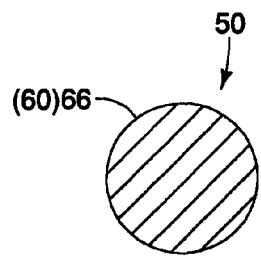
FIG. 5 is a cross-sectional view of the spoke taken along the line 5-5 in FIG. 3 in accordance with the first embodiment.
Figure 6:
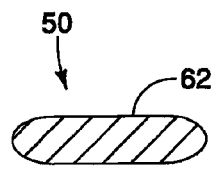
FIG. 6 is a cross-sectional view of the spoke taken along the line 6-6 in FIG. 3 in accordance with the first embodiment.

The rim attachment end 60 has a shaft portion 66 that has circular cross-section, as shown in FIG. 5, terminating with an enlarged nipple end 68. The central section 62 has a flattened profile similar to an airfoil to reduce wind resistance, with a long thin (or flattened) cross-section, as shown in FIG. 6. The hub attachment end 64 includes a shaft portion 70 with a circular cross-section that is similar or the same as the shaft portion 66, and a threaded end portion 72.

As is best shown in FIGS. 3 and 4, enlarged nipple end 68 of the rim attachment end 60 of the spoke 50 has a distal diameter that is larger than a diameter of the hub attachment end 64.

As best shown in FIG. 3, the spoke nipple 52 (a coupling nipple) has central aperture 80 with a recessed end 82 that is shaped to receive the enlarged nipple end 68, and a threaded outer surface 84 dimensioned to thread into one of the threaded apertures of the rim 14. More specifically, the threads of the threaded outer surface 84 are dimensioned to thread into the threaded apertures 24 of the rim 14, as is explained further below.

Figure 7:
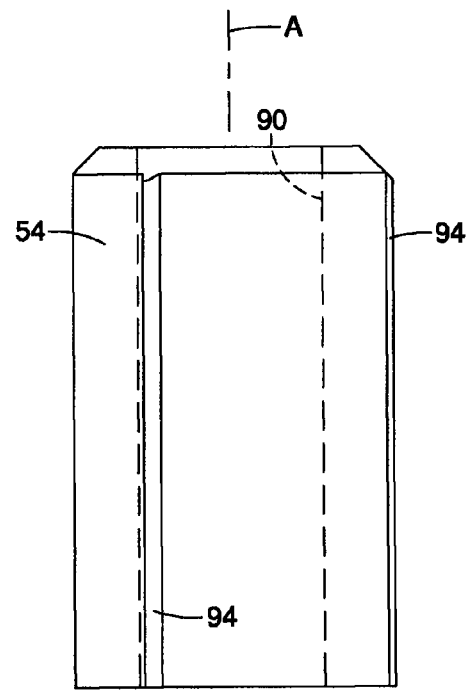
FIG. 7 is a side elevational view of the spoke nut shown removed from the spoke having three axially extending ribs on an outer surface of the spoke nut in accordance with the first embodiment.
Figure 8:
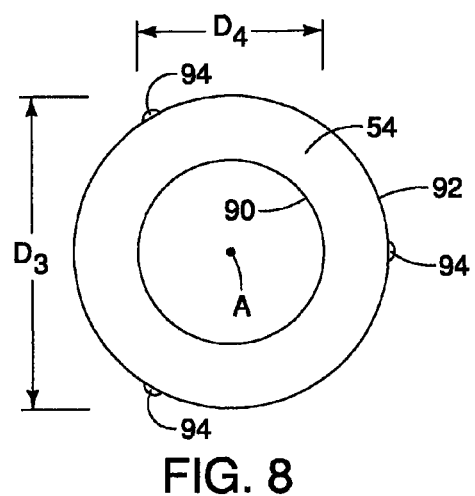
FIG. 8 is an end view of the spoke nut shown removed from the spoke further showing the three axially extending ribs on the outer surface of the spoke nut in accordance with the first embodiment.
Figure 9:
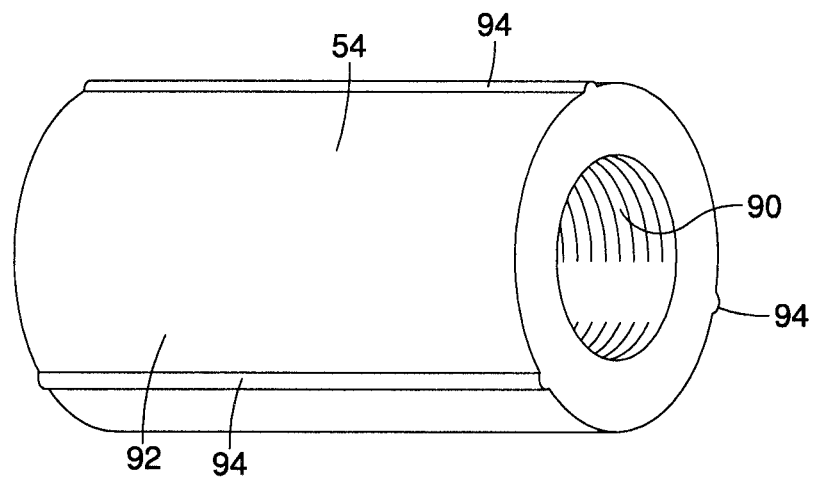
FIG. 9 is a perspective view of the spoke nut showing internal threads that extend the length of a central aperture of the spoke nut in accordance with the first embodiment.
Figure 11:
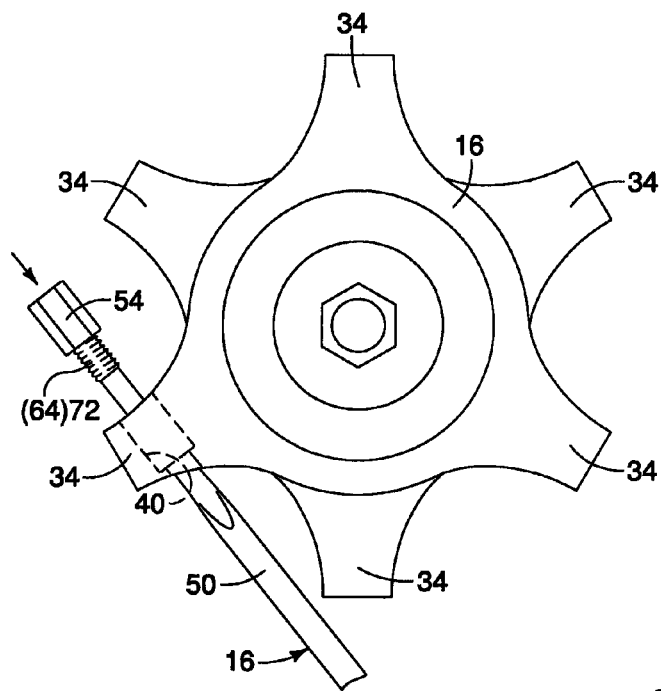
FIG. 11 is another side elevational view of the hub similar to FIG. 10 showing the spoke nut being installed to the spoke in accordance with the first embodiment.
Figure 12:
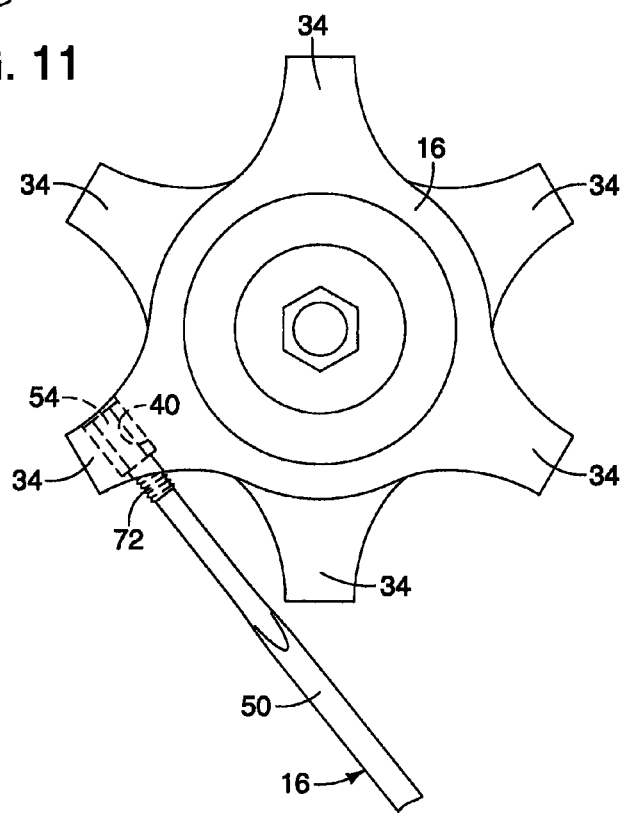
FIG. 12 is another side elevational view of the hub similar to FIGS. 10 and 11 showing the spoke nut being installed to the hub in accordance with the first embodiment.

As best shown in FIGS. 7, 8 and 9, the spoke nut 54 has a main body that has an overall cylindrical shape with a central aperture 90 (a bore) that includes threads. The central aperture 90 preferably extends completely through the main body of the spoke nut 54, but can alternatively be a blind bore that only extends part way through the spoke nut 54. As indicated in FIGS. 4, 11 and 12, the threaded end portion 72 of the spoke 50 is threaded into the central aperture 90 of the spoke nut 54.

The spoke nut 54 also includes a cylindrically shaped outer surface 92 that has three axially extending projections or ribs 94. The central aperture 90 defines a central axis A of the spoke nut 54. With the spoke nut 54 threaded onto to the spoke 50, the axis A coincides with a longitudinal center of the spoke 54, as indicated in FIG. 3. The outer surface 92 preferably defines an overall cylindrical shape interrupted by the ribs 94. The ribs 94 extend axially along the outer surface 92 in a direction that is parallel to the axis A. The threads of the central aperture 90 are dimensioned to thread onto the threads of the threaded end portion 72 of the hub attachment end 64 of the spoke 50, as explained further below.

As indicated in FIGS. 8 and 16, the outer surface 92 of the spoke nut 54 has an outer diameter $D_3$ (measured to include the ribs 94) that can be dimensioned in a variety of ways, such as a snug fit engagement, an interference fit engagement or a press fit engagement.

In the snug fit engagement, the outer diameter $D_3$ is slightly less than or equal to the diameter $D_2$ ($D_3 \leq D_2$). In the snug fit engagement, the outer diameter $D_3$ is preferably several thousandths of an inch smaller than the diameter $D_2$. Thus, in the snug fit, the ribs 94 of the spoke nut 54 allow for relatively easy installation and removal of the spoke nut 54 from the spoke receiving aperture 40, but basically eliminate any movement of the spoke nut 54 within the spoke receiving aperture 40. A cyclist can easily install and remove the spoke nut 54 manually without the use of tools with a snug it engagement. As can be understood from this snug fit engagement, an entirety of the internal surface of the spoke receiving aperture 40 will maintain the same, unchanged shape when the spoke nut 54 is inserted. With the snug fit engagement, the tolerances of the ribs 94 of the spoke nut 54 and the spoke receiving aperture 40 are not critical because it is desirable to prevent the spoke nut 54 from rotating. Hence, if the spoke receiving aperture 40 has any slight imperfections (not absolutely straight, slightly out of round, or not having a smooth inner surface), then the spoke nut 54 will be non-rotatably retained within the spoke receiving aperture 40.

In an interference fit engagement, the outer diameter $D_3$ is preferably equal to the diameter $D_2$ ($D_3=D_2$). In the interference fit engagement, the outer diameter $D_3$ is preferably the same as the diameter $D_2$. Thus, in the interference fit, the ribs 94 of the spoke nut 54 requires a small amount of force for installation and removal of the spoke nut 54 from the spoke receiving aperture 40. The cyclist can install and remove the spoke nut 54 manually without the use of tools, but needs to apply a small amount of force for the spoke nut 54 to fit into the spoke receiving aperture 40 with the interference fit engagement. As can be understood from this interference fit engagement, an entirety of the internal surface of the spoke receiving aperture 40 will maintain the same, unchanged shape the spoke nut 54 is inserted.

In the press fit engagement, the outer diameter $D_3$ is greater than the diameter $D_2$ ($D_3>D_2$). In the press fit engagement, the outer diameter $D_3$ is at least several thousandths of an inch larger than the diameter $D_2$. Thus, in the press fit, the ribs 94 of the spoke nut 54 are dimensioned such that some force is required to press fit the spoke nut 54 into the spoke receiving aperture 40. The cyclist will likely need tools, such as pliers and/or a small hammer to install and remove the spoke nut 54 in order to apply a sufficient amount of force for the spoke nut 54 to fit into the spoke receiving aperture 40 with the press fit engagement.

Hence, in the interference fit engagement and the press fit engagement, the ribs 94 can gouge, scratch or slightly deform the surface of the spoke receiving aperture 40 when the spoke nut 54 is installed into the spoke receiving aperture 40. Further, the spoke nut 54 is non-rotatably fitted into the spoke receiving aperture 40, and requires a small amount of force to remove.

Regardless, the outer surface 92 of the spoke nut 54 has at least one axially extending rib 94 that is configured for engagement with a spoke receiving aperture 40 of the hub 16 restricting rotation of the spoke nut 54 relative to the spoke receiving aperture 40. However, it should be understood from the drawings and the description herein that the number of ribs 94 and the overall dimensions of the ribs 94 can be varied. For example, in the depicted embodiments, there are three ribs 94. Alternatively, only one rib 94 can be provided. Further, two ribs 94 or more than three ribs 94 can be provided. As well, the ribs can be made with sharp distal edges or the rounded edges shown in the drawings.

More specifically, the rib 94 (or ribs 94) of the spoke nut 54 are dimensioned such that the spoke nut 54 is preferably force fitted (snug, interference or press fit engagement) into the corresponding spoke receiving opening 40 (a spoke nut receiving aperture). Since the spoke receiving opening 40 has a smooth cylindrically shaped surface, engagement between the spoke receiving opening 40 and the rib 94 or ribs 94 provides an interference (non-rotatable) fit. In other words, a mating shape of the outer surface 92 of the spoke nut 54 including the rib 94 or ribs 94) is different from (non-matching with) a mating shape of the smooth cylindrically shaped surface of the spoke receiving opening 40.

As best shown in FIG. 17, the central aperture 90 (the bore) of the spoke nut 54 has a fourth diameter $D_4$ that is smaller than the first diameter $D_1$ of the first section 42 of the spoke receiving aperture 40. Consequently, an end surface 98 of the spoke nut 42 is exposed within the first section 42 of the spoke receiving aperture 40. The exposed portion of the end surface 98 of the spoke nut 42 can be pressed against by a tool (not shown) for removal of the spoke nut 42 in the event that replacement of the spoke assembly 12 is necessary.

A description of a method of assembling the spoke assembly 12 and installing the spoke assembly 12 to the rim 14 of the bicycle wheel 10 is now provided with specific reference to FIGS. 3, 4 and 10-17.

As indicated in FIG. 3, the second end section 64 is inserted into the central aperture 80 of the spoke nipple 52. The central aperture 80 of the spoke nipple 52 has a diameter that is as large, or larger than the shaft portion 66 of the first end section 60, the central section 62 and the second end section 64 of the spoke 50. Hence, the spoke nipple 52 is slid along the spoke 50 until the enlarged nipple end 68 engages the surface of the recessed end 82 of the spoke nipple 52. As is indicated in FIGS. 3 and 4, the enlarged nipple end 68 is dimensioned to be retained within the recessed end 82 of the spoke nipple 52.

Figure 10:
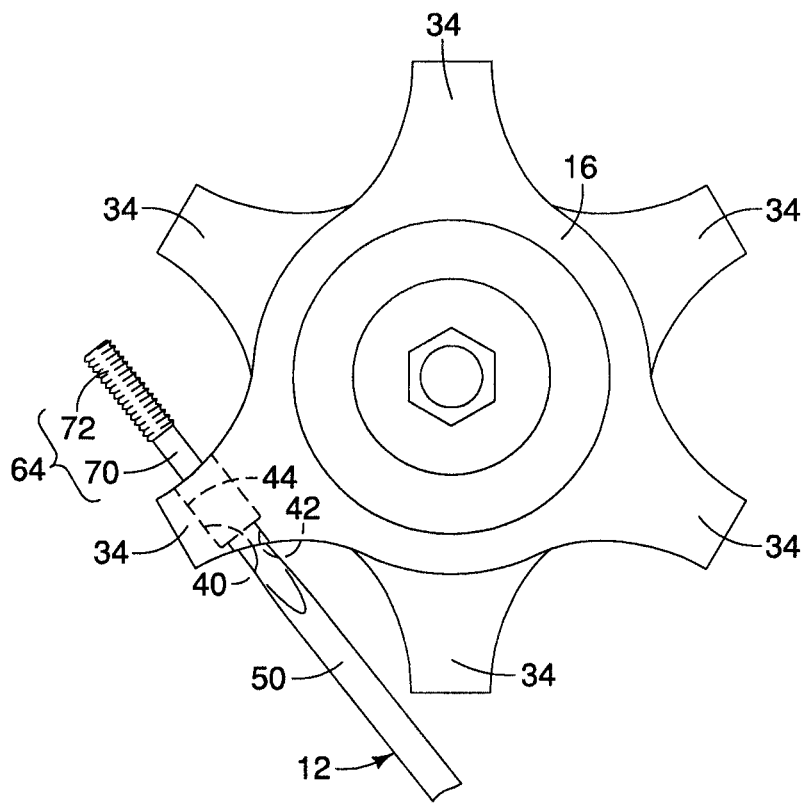
FIG. 10 is a side elevational view of the hub showing one of the spokes being installed to the hub in accordance with the first embodiment.

Next, as indicated in FIG. 10, the second end section 64 of the spoke 50 is first inserted into the first section 42 and then pushed through the second section 44 of the spoke receiving opening 40 until the threaded end portion 72 is exposed on the second section 44 side of the spoke receiving opening 40. Next, as shown in FIG. 11, the spoke nut 54 is threaded onto the threaded end portion 72 of the second end section 64 of the spoke 50. Thus, the second end section 64 (the hub attachment end) of the spoke 50 is threadedly secured within the central aperture 90 of the spoke nut 54.

In one embodiment, the threads of the threaded end portion 72 of the spoke 50 and the threads of the central aperture 90 of the spoke nut 54 are dimensioned to be tightly fitting such that tools are required for threading the spoke nut 54 onto the spoke 50. In this case, rotation of the spoke 50 relative to the spoke nut 54 during spoke tensioning adjustments and bicycle use is prevented.

Alternatively, an adhesive material, such as a thread locking material, can be applied to one or both of the threads of the threaded end portion 72 of the spoke 50 and the central aperture 90 of the spoke nut 54, essentially locking them together. In this case, rotation of the spoke 50 relative to the spoke nut 54 during spoke tensioning adjustments and bicycle use is also prevented.

As indicated in FIG. 12, after orienting the central section 62 of the spoke 50 in a desired orientation relative to the hub 16, the spoke nut 54 is force-fitted into the second section 44 of the spoke receiving aperture 40 of the hub 16. The central section 62 is now essentially locked in the desired orientation until the spoke assembly 12 is removed from the hub 16.

As shown in FIG. 13, the spoke nipple 52 and the rim attachment end 60 are ready for attachment to the rim 14 of the bicycle wheel 10. As further indicated in FIG. 14, the spoke nipple 52 is gradually rotatably threaded into the threaded aperture 24. Once all of the spoke assemblies 12 are installed in this manner, the spoke nipples 52 are adjusted such that appropriate tension is applied to each of the spokes 50 of the spoke assemblies 12 in a spoke tensioning procedure.

Second Embodiment

Referring now to FIGS. 18-21, a hub 16' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the spoke assembly 12 is unchanged relative to the first embodiment. However, in the second embodiment, the hub 16' is provided with a plurality of projections 34' that each includes a spoke receiving aperture 40'. The spoke receiving aperture 40' is similar to the spoke receiving aperture 40 of the first embodiment. For example, the spoke receiving aperture 40' includes the first section 42 (same as in the first embodiment). However, the spoke receiving aperture 40' also includes a second section 44' that has a plurality of recesses 100. The recesses 100 are dimensioned and radially spaced apart such that the ribs 94 of the spoke nut 54 are easily inserted therein. More specifically, the recesses 100 extend in a direct that is parallel to the central axis A. In the depicted embodiment, the number of recesses 100 is greater than the number of rib 94. Consequently, when the spoke assembly 12 is installed to the projection 34' of the hub 16', the installer can select any one of a plurality appropriate orientations of the spoke nut 54 relative to the recesses 100 of the spoke receiving aperture 40'. Hence, the central section 62 can be aligned in a desired orientation relative to the hub 16.

The steps for installing the spoke assembly 12 to the hub 16' are the same as in the first embodiment, except that the spoke nut 54 is aligned to the hub 16' by installing the ribs 94 in appropriate ones of the recesses 100 of the spoke receiving aperture 40'.

Third Embodiment

Referring now to FIGS. 22-28, a spoke assembly 12' in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the hub 16 (shown in FIGS. 25-28) is unchanged relative to the first embodiment. The hub 16 includes the projections 34 and the spoke receiving apertures 40.

The spoke assembly 12' of the third embodiment includes the spoke 50 of the first embodiment. However, in the spoke assembly 12', the spoke nut 54 of the first embodiment is replaced in the third embodiment with a spoke nut 54'.

Figure 22:
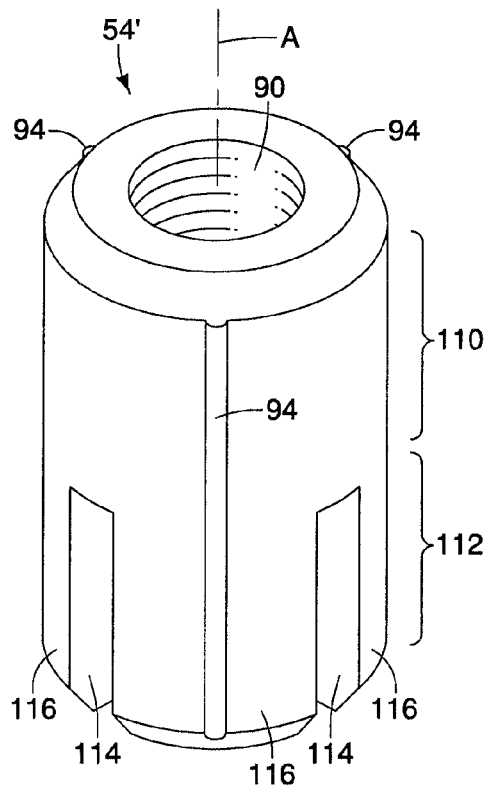
FIG. 22 is a perspective view of the spoke nut showing the press-fitting section and the spoke clamping section of the spoke nut in accordance with a third embodiment.
Figure 23:
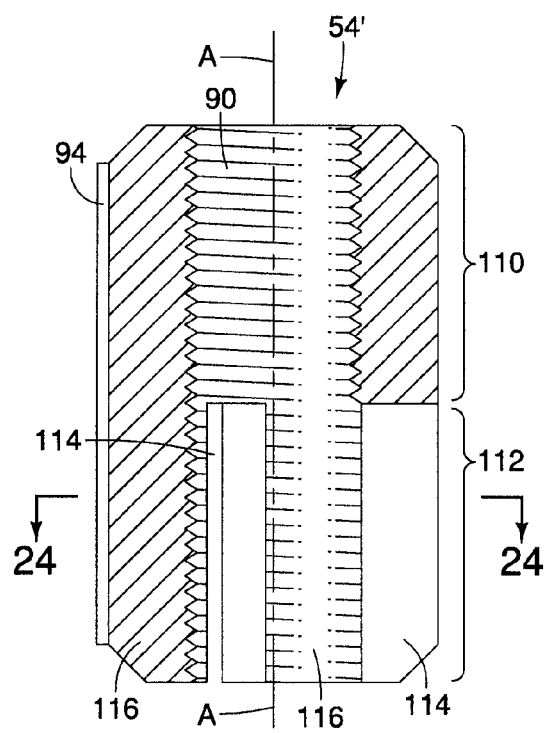
FIG. 23 is a longitudinal cross-sectional view of the spoke nut showing the press-fitting section and the spoke clamping section of the spoke nut in accordance with the third embodiment.
Figure 24:
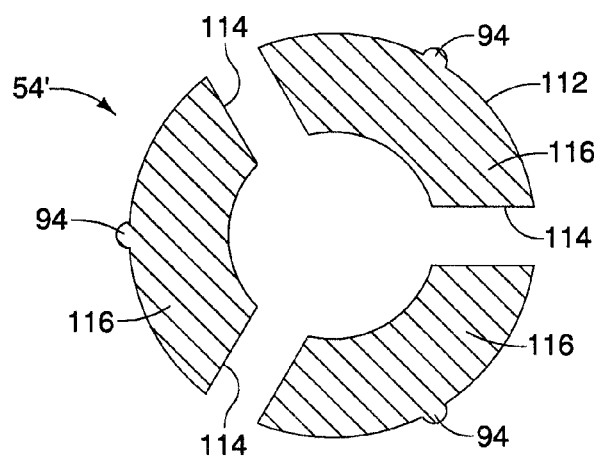
FIG. 24 is a transverse cross-sectional view of the spoke nut taken along the line 24-24 in FIG. 23 in accordance with the third embodiment.
Figure 25:
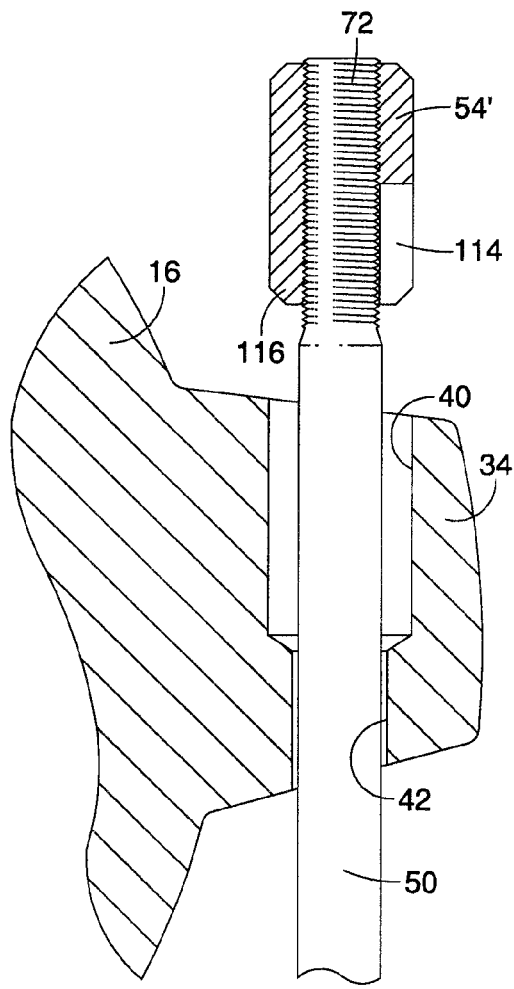
FIG. 25 is a cross-sectional view of a portion of the hub with a spoke and the spoke nut of the third embodiment being installed to the hub.

As shown in FIGS. 22, 23 and 24, the spoke nut 54' is similar to the spoke nut 54 of the first embodiment having the central aperture 90, the outer surface 92 and the three ribs 94. However, the spoke nut 54' includes a main body divided into to sections, a press-fitting section 110 and a spoke clamping section 112, with the ribs 94 extending along both the press-fitting section 110 and the spoke clamping section 112.

The press-fitting section 110 has an overall cylindrical shape with the clamping section 112 extending in the axial direction (relative to the axis A) from the press-fitting section 110. The press-fitting section 110 of the spoke nut 54' is dimensioned such that the press-fitting section 110 has either an interference fit engagement or a press-fit engagement with the spoke nut receiving aperture 40, as described in greater detail below.

Figure 26:
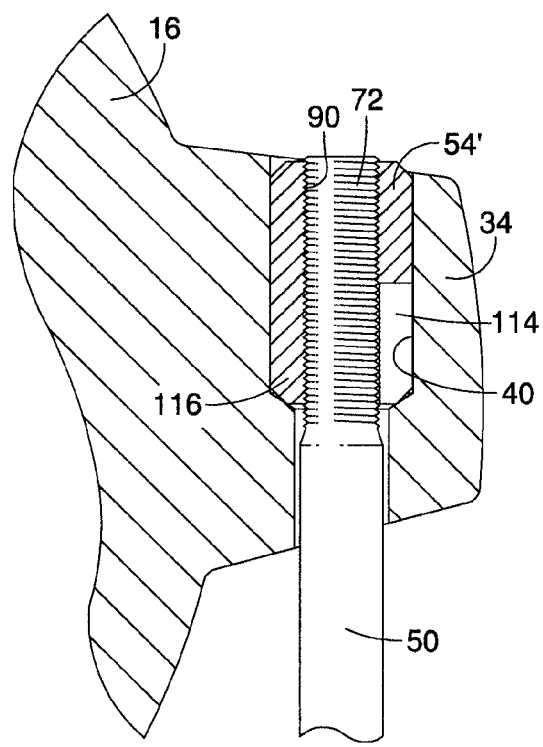
FIG. 26 is a cross-sectional view, similar to FIG. 25, of the portion of the hub with the spoke nut installed into a spoke nut receiving aperture of the hub in accordance with the third embodiment.
Figure 27:
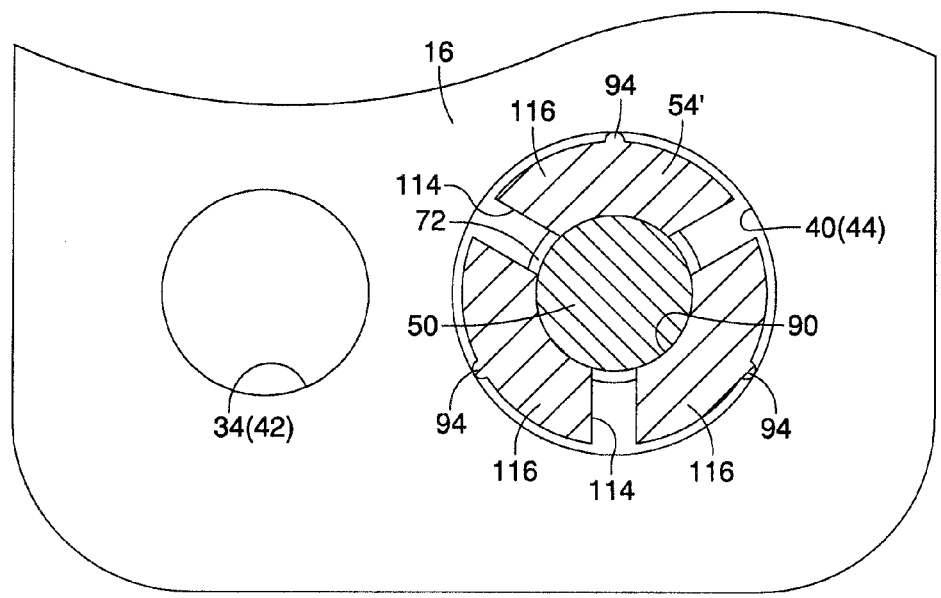
FIG. 27 is a cross-sectional view of the spoke nut installed in the spoke nut receiving aperture in accordance with the third embodiment.
Figure 28:
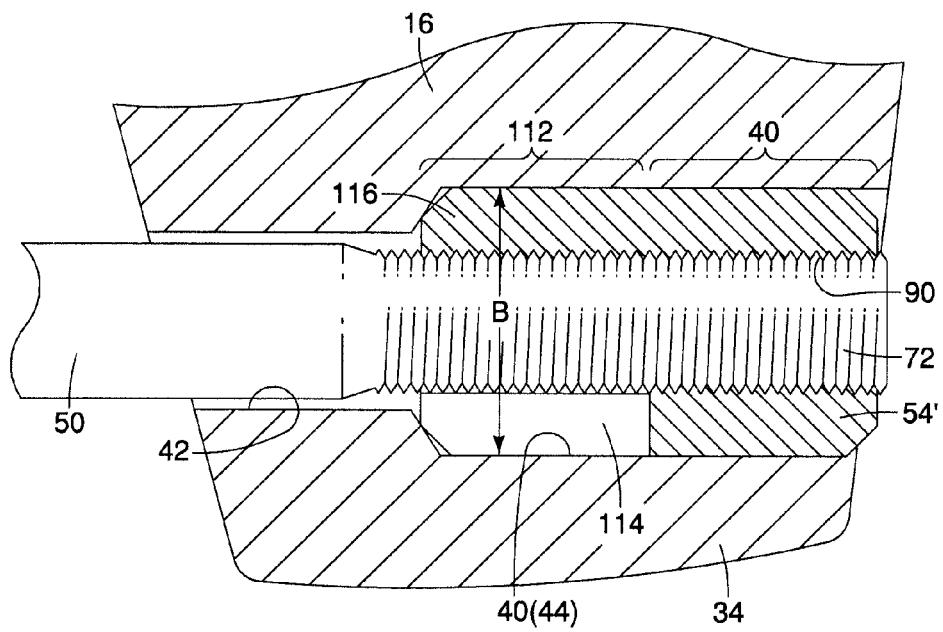
FIG. 28 is a cross-sectional view showing the spoke nut installed within the spoke nut receiving aperture of the hub in accordance with the third embodiment.

The spoke clamping section 112 includes at least one axially extending slit 114 dimensioned such that the spoke clamping section 112 clamps around the hub attachment end 64 of the spoke 50 with the spoke nut 54' inserted into one of the spoke nut receiving apertures 40, as indicated in FIGS. 26 and 28.

In the depicted embodiment, the spoke clamping section 112 includes three axially extending slits 114. Each of the slits 114 extends approximately half the axial length of the spoke nut 54', such that the press-fitting section 110 and the spoke clamping section 112 are of approximately equal length. However, it should be understood from the drawings and the description herein that the press-fitting section 110 and the spoke clamping section 112 can also be provided with unequal axial lengths.

The slits 114 are depicted with square corners, but can alternatively be provided with rounded corners. In other words the overall shape of each of the slits 114 can vary relative to the depicted size and shape of the slits 114. The slits divide the spoke clamping section 112 into three projections or legs 116. As shown in the drawings, the ribs 94 are centered on an exterior surface of corresponding ones of the legs 116.

The spoke clamping section 112 and the ribs 94 are dimensioned such that when the spoke nut 54' is pressed into the spoke receiving aperture 40, the legs 116 of the spoke clamping section 112 are elastically deformed by contact between the ribs 94 and the inner surface of the spoke nut receiving aperture 40 thereby clamping the spoke 50 within the central aperture 90 (the bore) of the spoke nut 54.

More specifically, when the spoke nut 54' is inserted into the spoke receiving aperture 40, the ribs 94 contact the inner surface of the spoke receiving aperture 40. The legs 116 of the spoke clamping section 112 are elastically deformed by the contact between the ribs 94 and the inner surface of the spoke nut receiving aperture 40. Since the legs 116 are slightly elastically deformed, they clamp around the threaded end portion 72 of the spoke 50 as indicated by the arrows B, indicating a radial inward force applied to the legs 116.

Also, since the legs 116 are slightly elastically deformed, the section of the ribs 94 on the legs 116 only slightly deforms, gouges or scars the inner surface of the spoke nut receiving aperture 40. However, once the press-fitting section 110 is pressed into the spoke nut receiving aperture 40, the ribs 94 more fully engage the inner surface of the spoke nut receiving aperture 40 causing further gouging and/or scaring of the inner surface of the spoke nut receiving aperture 40. Thus, the ribs 94 of the spoke nut 54' prevent rotation and/or vibration of the spoke nut 54' within the spoke nut receiving aperture 40.

GENERAL INTERPRETATION OF TERMS

In understanding the scope of the present invention, the teen "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle spoke wheel assembly. Accordingly, these terms, as utilized to describe the bicycle spoke wheel assembly should be interpreted relative to a bicycle equipped with the bicycle spoke wheel assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wheel assembly comprising:
   a hub having a plurality of spoke nut receiving apertures, each of the spoke nut receiving apertures having a smooth cylindrically shaped internal surface;
   a spoke having a rim attachment end, a hub attachment end, and a central section having a flattened profile, the central section being disposed between the rim attachment end and the hub attachment end; and
   a spoke nut having a main body with an outer surface disposed within one of the spoke nut receiving apertures and a bore extending at least partially through the main body,
   the outer surface having at least one axially extending rib dimensioned relative to the one of the spoke nut receiving apertures for contact therewith,
   the bore of the main body of the spoke nut having threads with the hub attachment end of the spoke being threadedly secured within the bore, and
   the smooth cylindrically shaped internal surface of the one of the spoke nut receiving apertures and the outer surface of the spoke nut having non-matching mating shapes.

2. The bicycle wheel assembly according to claim 1, wherein
   the outer surface includes at least two axially extending ribs configured for contact with the one of the spoke nut receiving apertures of the hub.

3. The bicycle wheel assembly according to claim 1, wherein
   the bore of the spoke nut defines a central axis of the main body and the rib extends in a direction parallel to the central axis.

4. The bicycle wheel assembly according to claim 1, wherein
   the rib of the spoke nut is dimensioned relative to the one of the spoke nut receiving apertures such that the spoke nut has an interference fit within the one of the spoke nut receiving apertures.

5. The bicycle wheel assembly according to claim 4, wherein
   an outer diameter of the outer surface of the spoke nut is equal to a diameter of the smooth cylindrically shaped surface of the one of the spoke nut receiving apertures.

6. The bicycle wheel assembly according to claim 1, further comprising
   a wheel rim having a plurality of spoke receiving apertures configured to couple to the rim attachment end of the spoke.

7. The bicycle wheel assembly according to claim 6, wherein
   the rim attachment end of the spoke has a distal diameter that is larger than a diameter of the hub attachment end.

8. The bicycle wheel assembly according to claim 7, wherein
   the spoke includes a coupling nipple rotatably disposed on the rim attachment end dimensioned for insertion into a corresponding one of the spoke receiving apertures of the wheel rim.

9. The bicycle wheel assembly according to claim 7, wherein
   each of the plurality of spoke nut receiving apertures includes a spoke nut receiving section having a first diameter and a spoke receiving section having a second diameter smaller than the first diameter.

10. The bicycle wheel assembly according to claim 9, wherein
    the bore of the spoke nut has a third diameter that is smaller than the second diameter such that, with the spoke nut installed within the one of the plurality of spoke nut receiving apertures, an annular section of an axial end surface of the spoke nut is exposed within the spoke receiving section.

11. The bicycle wheel assembly according to claim 1, wherein
    the main body of the spoke nut includes a spoke clamping section having at least one axially extending slit dimensioned such that the spoke clamping section clamps around the hub attachment end of the spoke with the spoke nut inserted into the one of the spoke nut receiving apertures.

12. The bicycle wheel assembly according to claim 11, wherein
    the spoke clamping section includes three axially extending slits.

13. The bicycle wheel assembly according to claim 11, wherein
    the main body of the spoke nut includes a press-fitting section having an overall cylindrical shape with the clamping section extending in an axial direction from the press-fitting section.

14. The bicycle wheel assembly according to claim 13, wherein
    the press-fitting section of the main body of the spoke nut is dimensioned such that the press-fitting section has an interference fit engagement with the one of the plurality of spoke nut receiving apertures and the spoke clamping section is elastically deformed by contact between the at least one axially extending rib and the one of the plurality of spoke nut receiving apertures clamping the spoke within the bore of the spoke nut.

15. The bicycle wheel assembly according to claim 1, wherein
the rib of the spoke nut is dimensioned relative to the one of the spoke nut receiving apertures such that the spoke nut has a press fit within the one of the spoke nut receiving apertures.

16. The bicycle wheel assembly according to claim 15, wherein
an outer diameter of the outer surface of the spoke nut is greater than a diameter of the smooth cylindrically shaped surface of the one of the spoke nut receiving apertures.

17. The bicycle wheel spoke assembly according to claim 1, wherein
an entirety of the smooth cylindrically shaped internal surface of the one of the spoke nut receiving apertures is configured to maintain the shape when the spoke nut is inserted.

18. A bicycle wheel spoke assembly comprising:
a spoke having a rim attachment end, a hub attachment end, and a central section having a flattened profile, the central section being disposed between the rim attachment end and the hub attachment end; and
a spoke nut having a main body with an outer surface and a bore extending at least partially, through the main body,
the outer surface having at least one axially extending rib configured for engagement with a spoke aperture of a bicycle wheel hub having a smooth cylindrically shaped internal surface, and
the bore of the main body of the spoke nut including threads the hub attachment end of the spoke being threadedly secured within the bore,
the outer surface of the spoke nut and the smooth cylindrically shaped internal surface of the spoke aperture having non-matching mating shapes.

19. The bicycle wheel spoke assembly according to claim 18, wherein
the outer surface includes at least two axially extending ribs configured for engagement with the spoke aperture of the bicycle wheel hub restricting rotation of the spoke nut relative to the spoke aperture.

20. The bicycle wheel spoke assembly according to claim 18, wherein
the bore defines a central axis of the main body and the rib extends in a direction parallel to the central axis.

* * * * *